(12) United States Patent
Howard et al.

(10) Patent No.: US 10,731,977 B1
(45) Date of Patent: Aug. 4, 2020

(54) AUTOMATED ZONE ACCURACY FOR LEVER-ARM AND EULER-ANGLE ALIGNMENT

(71) Applicant: Rockwell Collins, Inc., Cedar Rapids, IA (US)

(72) Inventors: Sean D. Howard, Cedar Rapids, IA (US); Michael S. Richard, Cedar Rapids, IA (US); Geoffrey A. Lohff, Williamsburg, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 182 days.

(21) Appl. No.: 16/054,279

(22) Filed: Aug. 3, 2018

(51) Int. Cl.
| G01B 11/26 | (2006.01) |
| G01C 3/08 | (2006.01) |
| G01B 11/14 | (2006.01) |
| G01C 9/00 | (2006.01) |
| G01C 9/06 | (2006.01) |

(52) U.S. Cl.
CPC .............. *G01B 11/26* (2013.01); *G01B 11/14* (2013.01); *G01C 3/08* (2013.01); *G01C 9/005* (2013.01); *G01C 2009/066* (2013.01)

(58) Field of Classification Search
USPC ........... 356/138, 139.02–139.08, 139.1, 140, 356/141.2, 141.3, 141.4, 141.5, 147, 149, 356/72, 614, 622, 623
See application file for complete search history.

(56) References Cited

U.S. PATENT DOCUMENTS

| 3,953,131 | A | * | 4/1976 | Britz | G01S 17/42 |
| | | | | | 356/141.1 |
| 4,099,879 | A | * | 7/1978 | Britz | G01S 17/42 |
| | | | | | 356/141.5 |
| 4,309,746 | A | * | 1/1982 | Rushworth | F41G 3/2616 |
| | | | | | 244/3.16 |
| 4,625,108 | A | * | 11/1986 | Nestel | G02B 6/04 |
| | | | | | 250/226 |
| 4,674,874 | A | * | 6/1987 | Halldorsson | G01S 3/782 |
| | | | | | 250/203.3 |
| 4,738,531 | A | * | 4/1988 | Lloyd | G01S 7/4811 |
| | | | | | 356/150 |
| 4,806,747 | A | * | 2/1989 | Dunavan | G01S 3/7835 |
| | | | | | 250/206.1 |
| 4,825,063 | A | * | 4/1989 | Halldorsson | G01S 3/7803 |
| | | | | | 250/206.1 |
| 5,018,447 | A | * | 5/1991 | Miller, Jr. | F42C 13/02 |
| | | | | | 102/213 |
| 5,047,776 | A | * | 9/1991 | Baller | G01S 3/043 |
| | | | | | 342/52 |
| 5,114,227 | A | * | 5/1992 | Cleveland, Jr. | G01S 3/781 |
| | | | | | 356/139.05 |

(Continued)

*Primary Examiner* — Gordon J Stock, Jr.
(74) *Attorney, Agent, or Firm* — Suiter Swantz pc llo

(57) ABSTRACT

A laser angle measuring device has a concave detection surface with a plurality of light sensors and an opaque light shield. One or more multi-axis gravity sense potentiometers determine the orientation of the laser angle measuring device, and a GPS receiver determines the location of the laser angle measuring device. The laser angle measuring device is part of a system including one or more laser emitters, each with one or more selectable laser sources. Each laser emitter may also include location and orientation measuring mechanisms.

20 Claims, 9 Drawing Sheets

(56) References Cited

U.S. PATENT DOCUMENTS

| | | | | |
|---|---|---|---|---|
| 5,218,360 A * | 6/1993 | Goetz | .................... | G01S 1/14 |
| | | | | 342/196 |
| 5,276,496 A * | 1/1994 | Heller | .................... | G01S 5/16 |
| | | | | 250/203.3 |
| 6,583,761 B1 * | 6/2003 | Angermeier | ............. | G01S 3/30 |
| | | | | 342/432 |
| 6,901,673 B1 * | 6/2005 | Cobb | ................. | G01B 21/045 |
| | | | | 33/227 |
| 7,277,053 B2 * | 10/2007 | Riel | .................... | G01S 3/043 |
| | | | | 250/233 |
| 7,515,257 B1 * | 4/2009 | Roe | .................... | B64G 1/646 |
| | | | | 356/139.03 |
| 7,619,754 B2 * | 11/2009 | Riel | .................... | G01S 3/784 |
| | | | | 250/226 |
| 7,898,477 B1 * | 3/2011 | Oxley | .................... | G01S 3/28 |
| | | | | 342/375 |
| 8,466,406 B2 * | 6/2013 | Hvass | .................... | G01S 5/16 |
| | | | | 250/214.1 |
| 10,452,157 B2 * | 10/2019 | Lohbihler | ............. | G06F 3/0346 |
| 2010/0141503 A1 * | 6/2010 | Baumatz | ................. | G01S 7/48 |
| | | | | 342/27 |
| 2019/0204078 A1 * | 7/2019 | Graham | ................. | G01C 9/06 |

* cited by examiner

AUTOMATED ZONE ACCURACY FOR LEVER-ARM AND EULER-ANGLE ALIGNMENT

BACKGROUND

When utilizing time-space-position information (TSPI) instrumentation, an inertial movement unit (IMU) is used to track movement changes. If the IMU measurement is located in an offset position by anything more than about 5 centimeters (2 inches), TSPI accuracy is compromised. Setting up IMU alignment is a complex effort requiring accurate measurements from the IMU to GSP antennas, the IMU to a defined navigation point, the IMU to a HT-DLTA, the IMU to a HT-DLTB, the IMU to PP, and the combination of these devices to an aircraft. Increasing the accuracy of these measurements produces more accurate TSPI measurements.

When performing an automated zone accuracy for lever-arm and Euler-angle alignment (AZALEA) process, the angles of incidence from laser distance measurements need to be recorded to determine the actual location in 3D space. Setting up spatial data for AZALEA needs highly accurate angle data from probe points. If a $3^{rd}$ point is drawn in physical space, outside of the apparatus being measured, and a laser distance measurement is utilized, the receiver receives extremely accurate angle measurements.

Any error in any of these measurements creates persistent erroneous data.

SUMMARY

In one aspect, embodiments of the inventive concepts disclosed herein are directed to a laser angle measuring device having a concave detection surface with a plurality of light sensors and an opaque light shield.

In a further aspect, the laser angle measuring device includes one or more multi-axis gravity sense potentiometers and a free-space location mechanism such as a satellite navigation system receiver.

In a further aspect, a system implementing the inventive concepts disclosed herein includes a laser emitter with a plurality of selectable emitter ports. The laser emitter may also include location and orientation measuring mechanisms.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
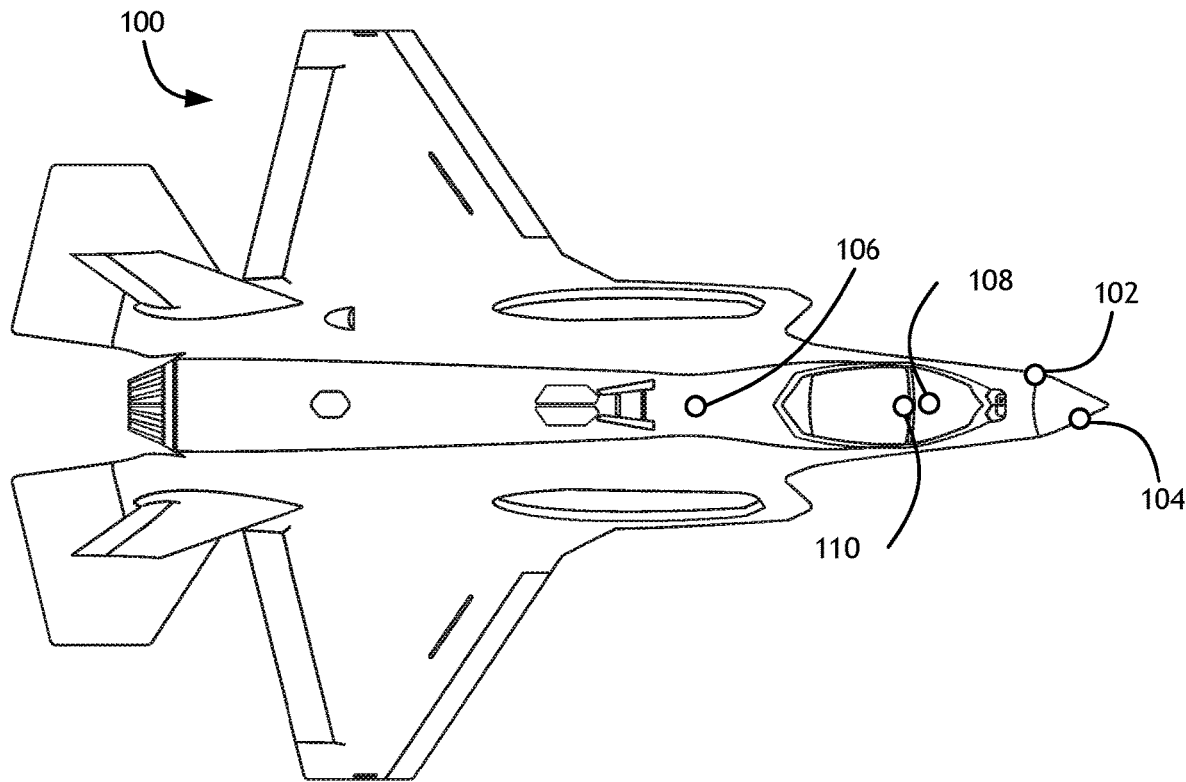
FIG. 1A shows a top environmental view of an exemplary embodiment of shows a top environmental view of an aircraft including embodiments of inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a laser angle measuring device have a concave detection surface with a plurality of light sensors and an opaque light shield. A system utilizing such laser angle measuring device may also include a laser emitter with a plurality of selectable emitter ports.

Figure 1B:
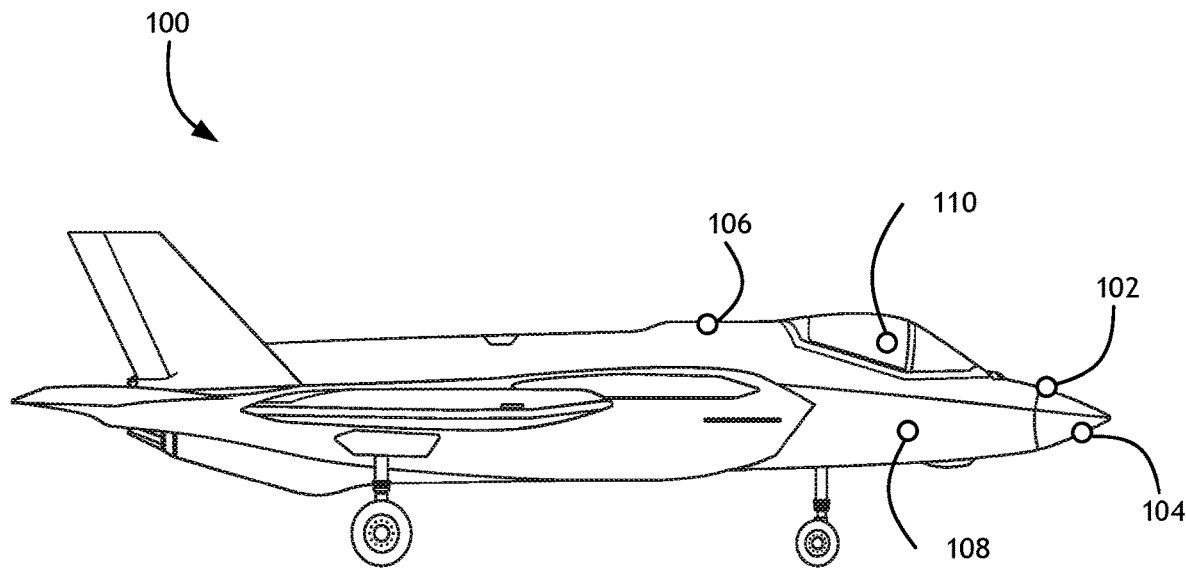
FIG. 1B shows a side environmental view of an exemplary embodiment of shows a top environmental view of an aircraft including embodiments of inventive concepts disclosed herein.

Referring to FIGS. 1A-1B, top and side environmental views of an exemplary embodiment of an aircraft 100 including embodiments of the inventive concepts disclosed herein is shown. Such an aircraft 100 may include an upper datalink (DLTA) antenna 102 for datalink communications, a lower datalink (DLTB) antenna 104 for datalink communications, a Global Positioning System (GPS) antenna 106, a defined or calculated IMU center of navigation 108 where inertia is measured, and a calculated track point 110 where all measurements are calculated from.

In one example, when trying to measure angular velocity, significant deviations result from errors in the known locations of those datums. The measured distance between the IMU center of navigation 108 and the GPS antenna 106 may be approximately 94 centimeters (37 inches), including the contours of the aircraft, while the real linear distance that should be used in calculations is approximately 63.5 centimeters (25 inches).

Where velocity V=500 knots and bank angle θ=30, the IMU center of navigation 108 would calculate angular velocity ω=1.25969°/second while the real angular velocity is ω=1.25669°/second, or a difference of about 0.003°/second.

Figure 2:
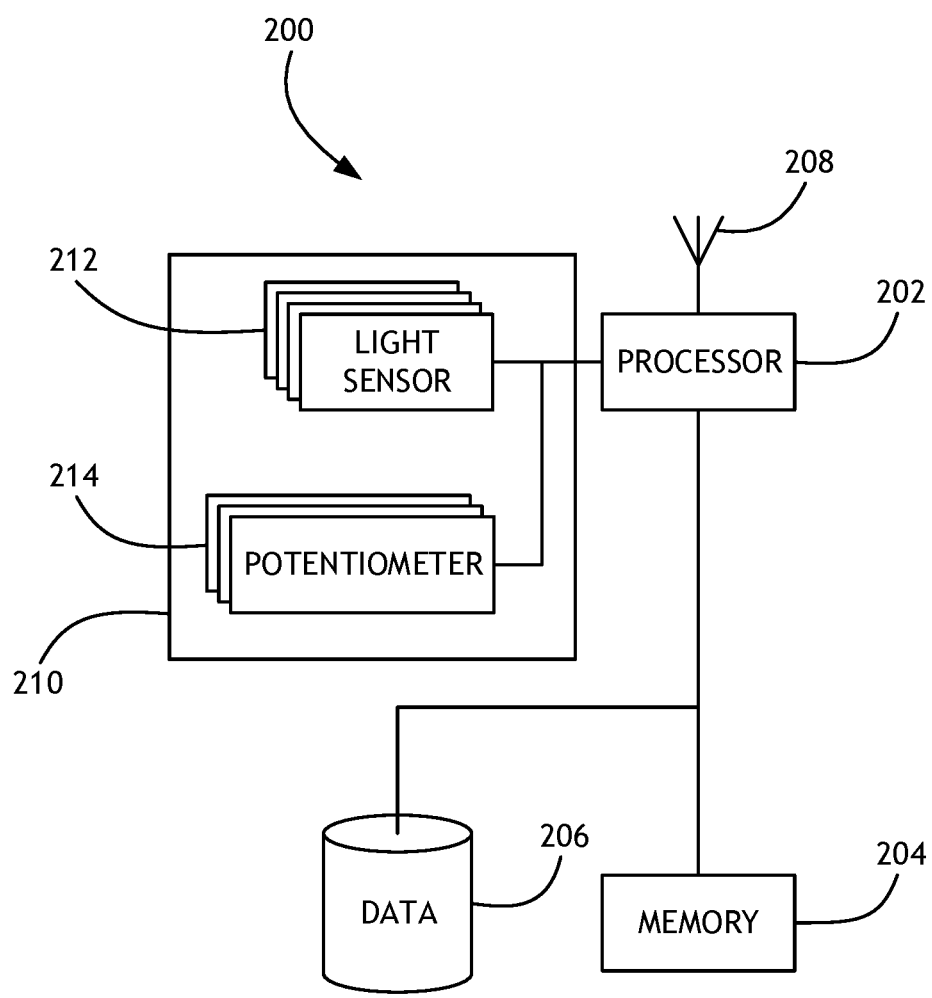
FIG. 2 shows a block diagram of an exemplary embodiment of a computer system for implementing the inventive concepts disclosed herein.

Referring to FIG. 2, a block diagram of an exemplary embodiment of a computer system 200 for implementing the inventive concepts disclosed herein is shown. The system 200 includes a processor 202, memory 204 connected to the processor 202 for storing processor executable code. In at least one embodiment, the system 200 includes a data storage element 206 for storing data produced by the processor 202 and/or a communication interface 208, either wired or wireless, to communicate data with one or more outside systems. In at least one embodiment, the communication interface 208 includes a GPS-real-time kinematic (RTK) antenna and chipset to determine the location of the system 200 the highest grade accuracy possible.

The system 200 includes a plurality of light sensors 210, each connected to the processor 202. Based on the light sensor 210 actually registering light, the processor 202 calculates the angle of a laser beam as more fully described herein. Furthermore, each of the plurality of light sensors 210 may register a range of illumination values such that the processor 202 may calculate an accurate angle based on illumination values received from more than on light sensor 210.

In at least one embodiment, the system 200 also includes an orientational measuring system 212 such as a 3-axis gravity sensor or potentiometer. The processor 202 may correlate the measured laser angle with the measured orientation of the system 200 to determine an absolute laser angle from a frame of reference outside the system 200.

Figure 3:
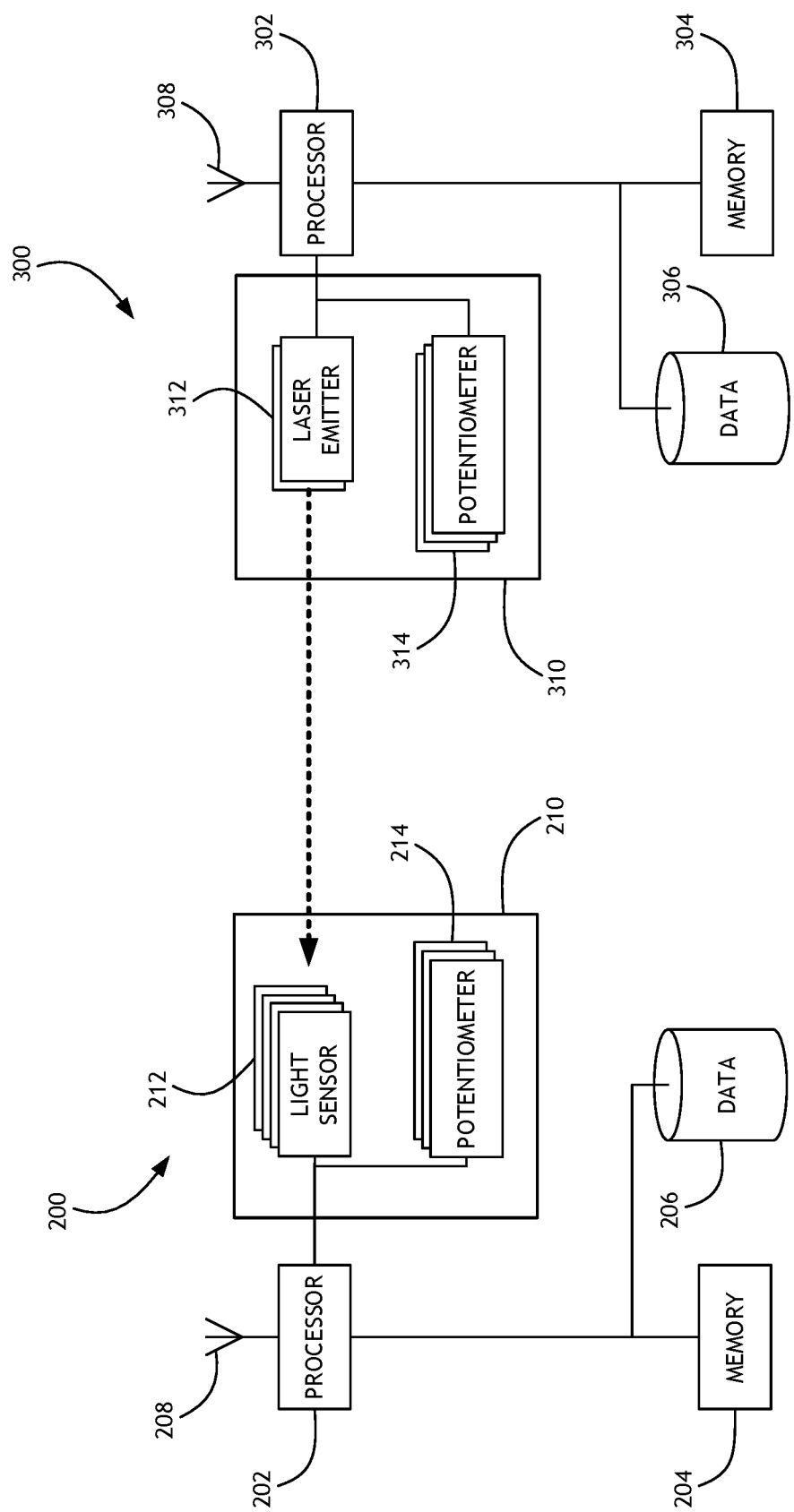
FIG. 3 shows a block diagram of an exemplary embodiment of a computer system for implementing the inventive concepts disclosed herein.

Referring to FIG. 3, a block diagram of an exemplary embodiment of computer systems 200, 300 for implementing the inventive concepts disclosed herein is shown. A laser angle measuring system 200 includes a processor 202, memory 204 connected to the processor 202, and a plurality of light sensors 210, each connected to the processor 202 to receive and calculate the angle of a laser beam. The laser angle measuring system 200 also includes an orientational measuring system 212 connected to the processor 202 to measure the orientation of the laser angle measuring system 200 and determine an absolute laser angle from an outside frame of reference. The laser angle measuring system 200 may include a data storage element 206 and/or a communication interface 208 to communicate measured datums to a separate computer system.

A laser emitter system 300 includes one or more laser emitters 310 which may be connected to a processor 302. The one or more laser emitters 310 may be disposed at known positions to provide a reference datum with a high degree of specificity. Where the laser emitter system 300 includes a processor 302, the processor 302 is connected to a memory 304 for storing processor executable code. In at least one embodiment, the laser emitter system 300 includes a data storage element 306 for storing data produced by the processor 302 and/or a communication interface 308, either wired or wireless, to communicate data with one or more outside systems, such as a corresponding laser angle measuring system 200.

In at least one embodiment, where the laser emitter system 300 includes a plurality of laser emitters 310, the laser emitter system 300 may include a selection mechanism, such as a switch, button, scroll wheel, etc., for selecting a single active laser emitter 310.

In at least one embodiment, the laser emitter system 300 also includes an orientational measuring system 312 such as a 3-axis gravity sensor or potentiometer. The processor 302 may correlate the known active laser emitter 310 with the measured orientation of the laser emitter system 300 to determine an absolute laser emission angle from a frame of reference outside the laser emitter system 300.

The laser emitter system 300 may communicate with one or more laser angle measuring systems 200 to share orientation data such that either the laser emitter processor 302, the laser angle measuring processor 202, or some outside computer system may correlate the measured orientation of the laser emitter system 300 with the measured orientation of the corresponding laser angle measuring system 200 to accurately define the relative location of the laser angle measuring system 200 and laser emitter system 300, and thereby accurately define the location of corresponding reference points on an aircraft. Such reference points may include a DLTA antenna, a DLTB antenna, a GPS antenna, etc., where a laser angle measuring system 200 is positioned at a location on the aircraft corresponding to reference point.

Figure 4:
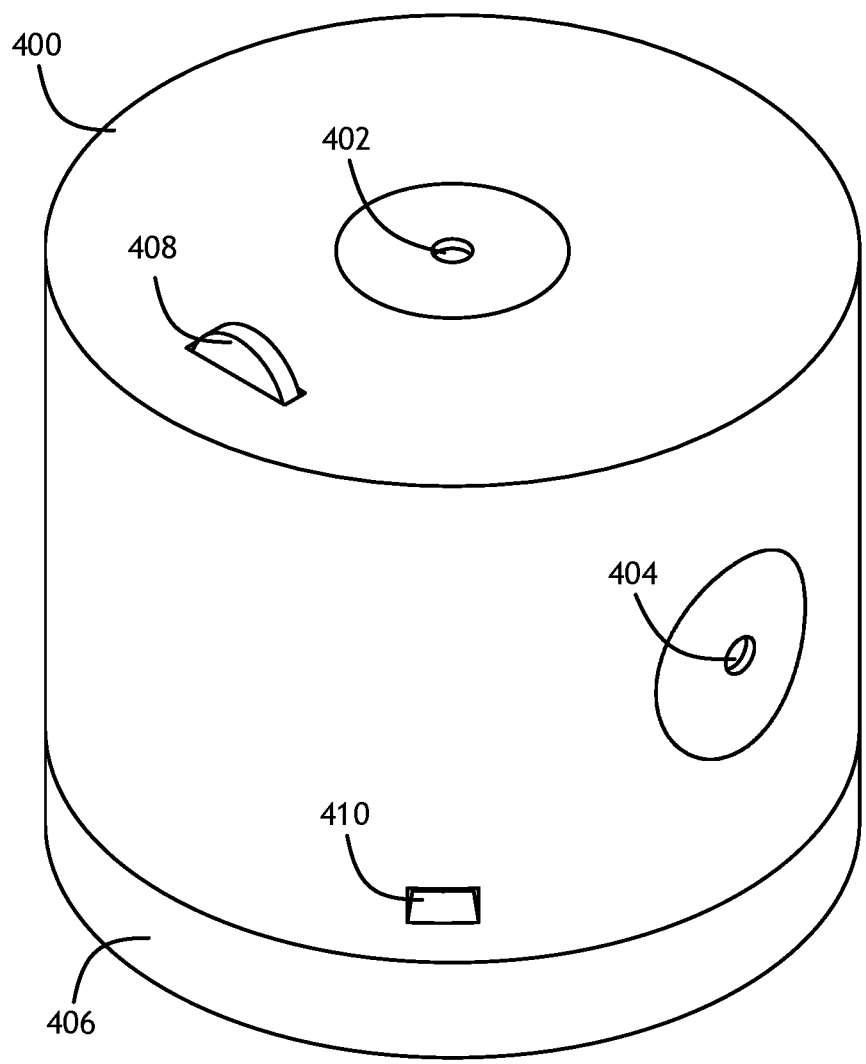
FIG. 4 shows a perspective view of view of an exemplary embodiment of a laser emitter device according to the inventive concepts disclosed herein.

Referring to FIG. 4, a perspective view of view of an exemplary embodiment of a laser emitter device according to the inventive concepts disclosed herein is shown. The laser emitter device includes a housing 400 that defines one or more laser emitter openings 402, 404 and houses one or more laser sources, each corresponding to one of the one or more laser emitter openings 402, 404. Where the laser emitter device includes more than one laser sources, the laser emitter device may include an input mechanism 408 such as a switch, scroll wheel, or other such device to selectively activate one laser source or to input an offset value where the laser emitter device must be placed some measurable distance above or below the desired datum.

In at least one embodiment, the laser emitter device may include an attachment mechanism 406 disposed on a surface of the housing 400 proximal to an aircraft body when in use. Such attachment mechanism 406 may a magnetic plate, vacuum element, adhesive, etc.

In at least one embodiment, the laser emitter device includes a wired or wireless data interfaces 410 such as RJ-45 Ethernet ports, Bluetooth antenna, etc. for communication with a corresponding laser angel measuring device.

In at least one embodiment, the laser emitter device includes a mechanism for measuring the orientation and location of the laser emitter device such a set of gravity sense potentiometers and/or a GPS-RTK antenna and chipset.

Figure 5:
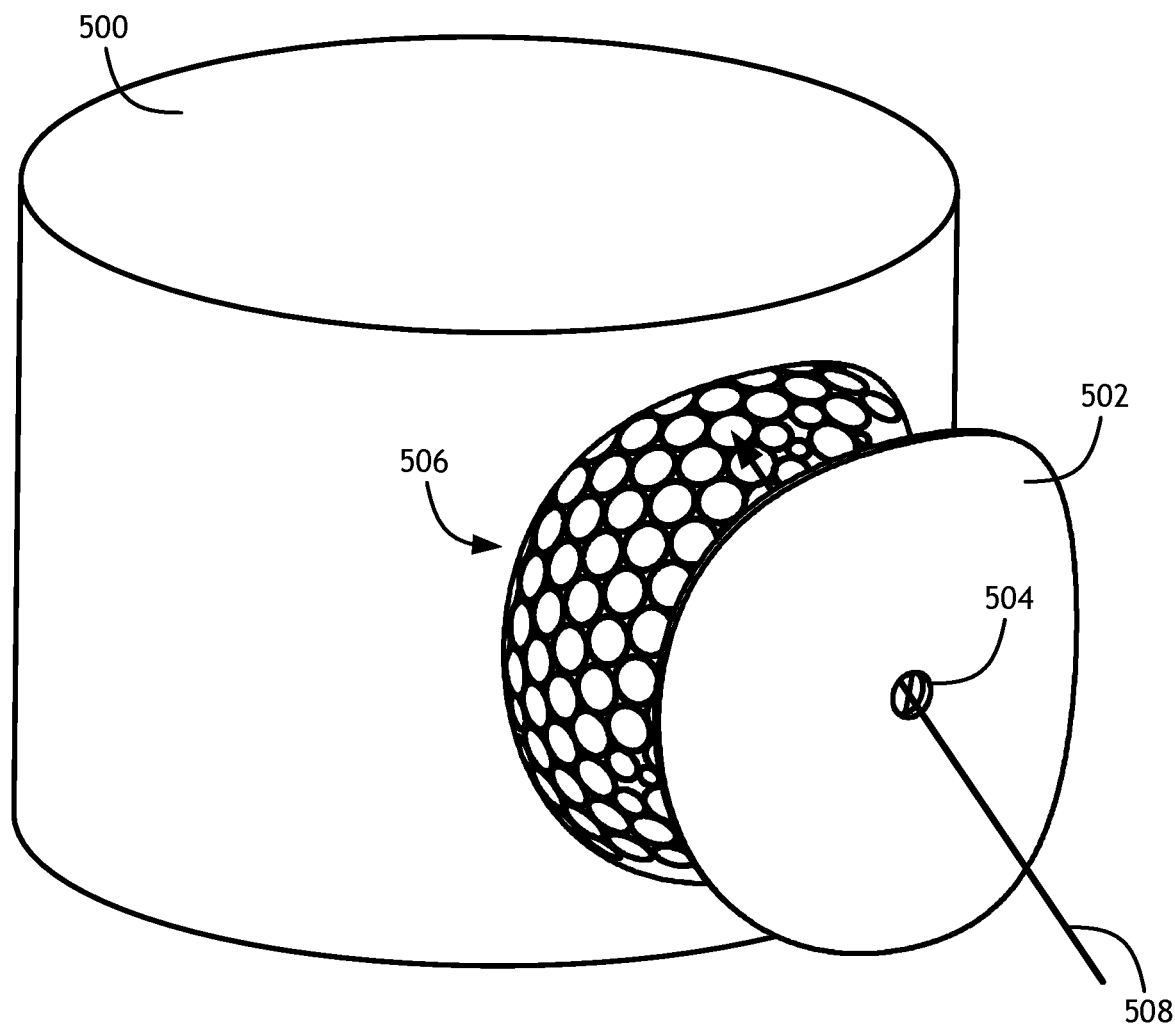
FIG. 5 shows a perspective view of an exemplary embodiment of a laser angle measuring device according to the inventive concepts disclosed herein.

Referring to FIG. 5, a perspective view of an exemplary embodiment of a laser angle measuring device according to the inventive concepts disclosed herein is shown. The laser angle measuring device includes a housing 500 that defines a concave light sensor surface 506. The concave light sensor surface is generally covered or occluded by an opaque plate 502 with laser opening 504 at a specific point to allow laser light 508 to enter and illuminate a portion of the light sensor surface in a tight beam. The laser opening 504 may include a filter to prevent light other that the expected laser light from entering.

The concave surface 506 places each of the light sensors along a specific trajectory of laser light 508 entering through the laser light opening 504 from a specific angle. The light sensors may thereby determine the angle of the laser light 508.

Figure 6:
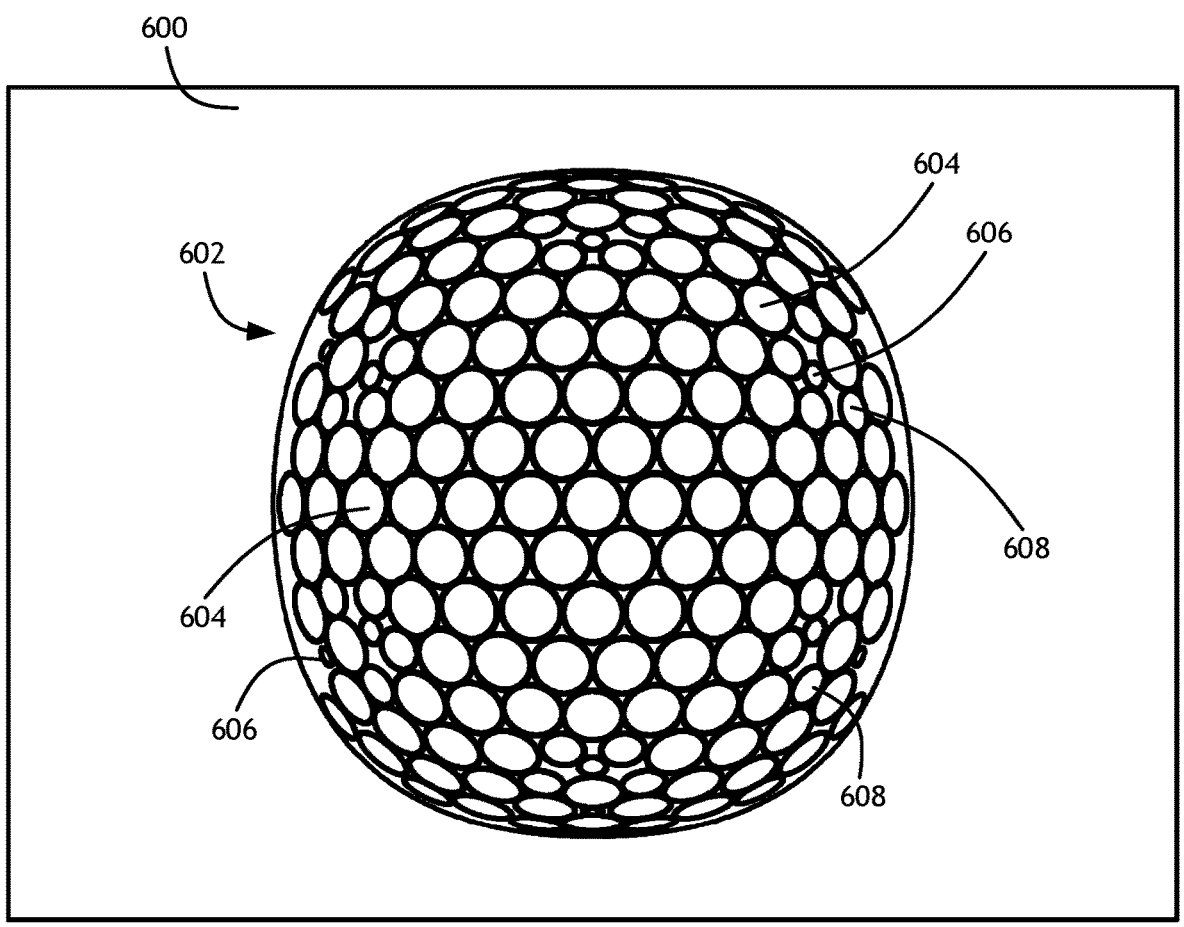
FIG. 6 shows a front view of an exemplary embodiment of a laser angle measuring device according to the inventive concepts disclosed herein.

Referring to FIG. 6, a front view of an exemplary embodiment of a laser angle measuring device according to the inventive concepts disclosed herein is shown. The device housing 600 defines a concave light sensor surface 602 that supports a matrix of light sensors 604, 606, 608. In at least one embodiment, the light sensors 604, 606, 608 are generally uniform and organized into as tightly packed configuration as possible based on the size of the light sensors 604, 606, 608 and the dimensions of the concave surface 602.

In at least one embodiment, the light sensors 604, 606, 608 may comprise differently sized light sensors 604, 606, 608 organized into a pattern to maximize the coverage area of the light sensors 604, 606, 608 by filling in gaps between large light sensors 604 with smaller light sensors 606, 608.

In at least one embodiment, the light sensors 604, 606, 608 may comprise differently sized light sensors light sensors 604, 606, 608 organized into a pattern to normalize angle measurements such that the angular difference measured by adjacent light sensors 604, 606, 608 is generally the same over the entire surface.

Figure 7:
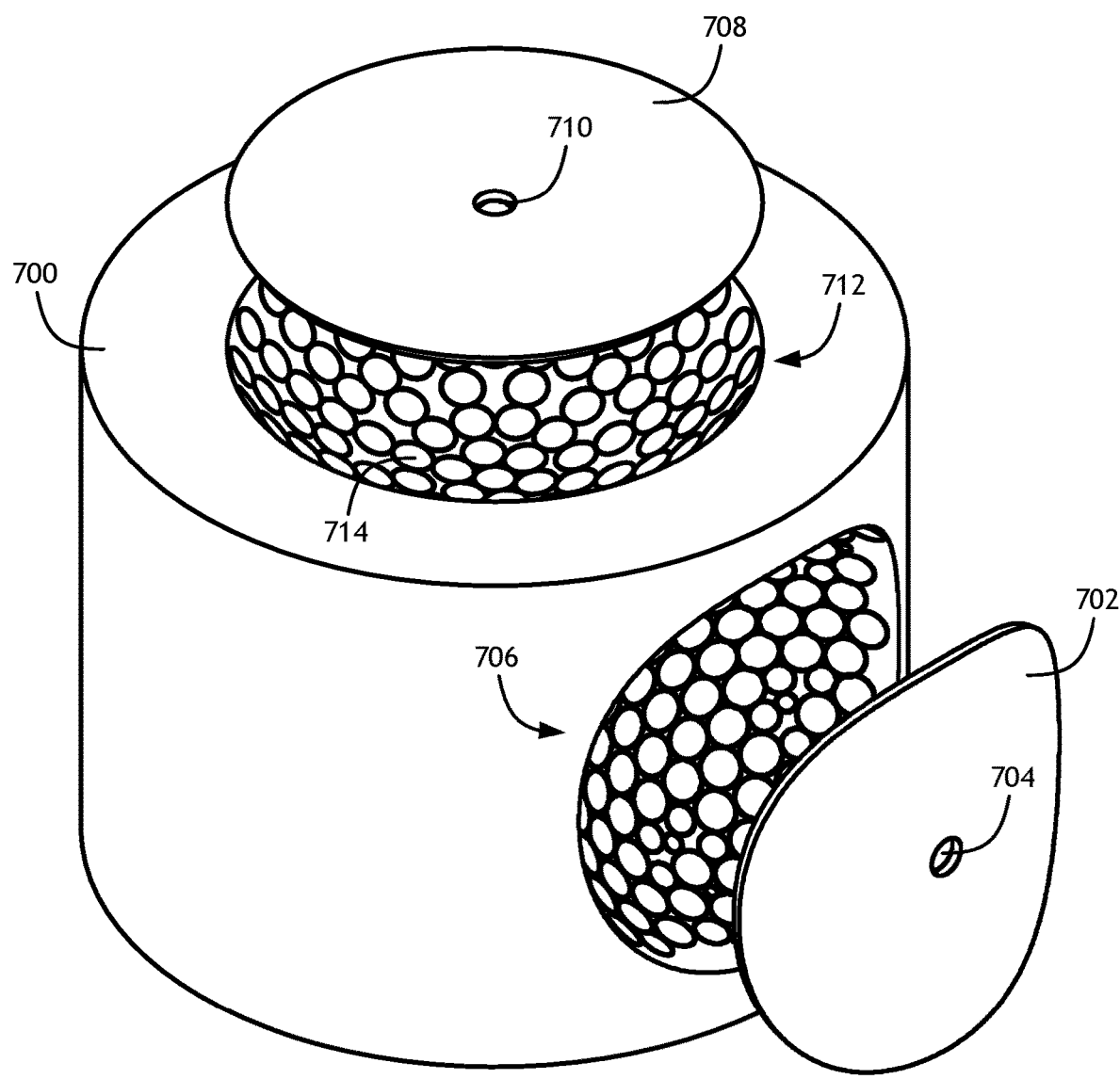
FIG. 7 shows a perspective view of an exemplary embodiment of a laser angle measuring device according to the inventive concepts disclosed herein.

Referring to FIG. 7, a perspective view of an exemplary embodiment of a laser angle measuring device according to the inventive concepts disclosed herein is shown. The device housing 700 defines a first concave light sensor surface 706 that supports a matrix of light sensors, obscured by an opaque plate 702 that defines a laser light opening 704. Furthermore, the device housing 700 may define a second concave light sensor surface 712 obscured by a corresponding opaque plate 708 that supports a separate matrix of light sensors 714 to measure laser light entering a corresponding laser light opening 710 from a direction that would be otherwise unmeasurable via the first concave light sensor surface 706.

In at least one embodiment, the light sensors 704, 706, 708 are generally uniform and organized into as tightly packed configuration as possible based on the size of the light sensors 704, 706, 708 and the dimensions of the concave surface 702.

Figure 8:
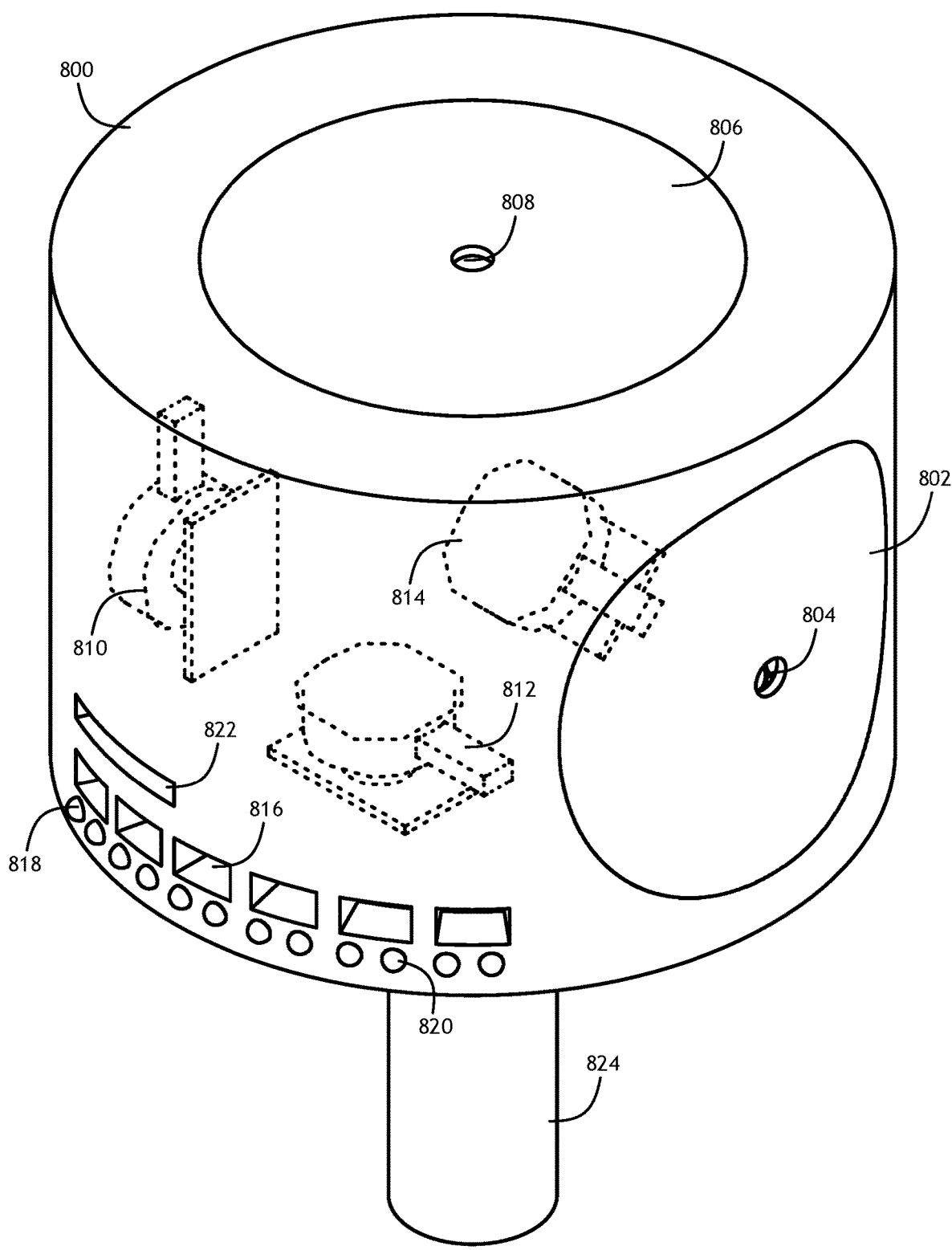
FIG. 8 shows a perspective view of an exemplary embodiment of a laser angle measuring device according to the inventive concepts disclosed herein.

Referring to FIG. 8, a perspective view of an exemplary embodiment of a laser angle measuring device according to the inventive concepts disclosed herein is shown. A laser angle measuring device 800 includes at least one plurality of light sensors disposed in a concave surface, obscured by a corresponding opaque plate 802, 806 that defines a laser opening 804, 808 such as in FIG. 5.

In at least one embodiment, the laser angle measuring device 800 also includes an orientational measuring system comprising a plurality of gravity sense potentiometers 810, 812, 814, each oriented at an angle to produce a measurement of the orientation of the laser angle measuring device 800 within an outside frame of reference.

In at least one embodiment, the laser angle measuring device 800 includes one or more wired or wireless data interfaces 816 such as RJ-45 Ethernet ports, Bluetooth antenna, etc. Each data interface 816 may be associated with a specific laser emitter device. Such data interface 816 may be useful for receiving data from or applying firmware updates to the corresponding laser emitter device. Furthermore, each data interface 816 may be associated with one or more status indicators 818, 820 such as a first indicator 818 that the corresponding laser emitter device is active and a second indicator 820 that indicates receiving or programming the corresponding laser emitter device has succeeded or failed. Furthermore, each data interface 816 may be associated with an LED display for providing more complex data to a user.

In at least one embodiment, the laser angle measuring device 800 includes a Compact Flash card reader 822 for storing all of the recorded data points in a portable format for use by the aircraft.

In at least one embodiment, the laser angle measuring device 800 may include a mounting mechanism 824 or support device such as a tripod to place the laser angle measuring device 800 in proximity to an aircraft corresponding to one or more laser emitter devices.

Figure 9:
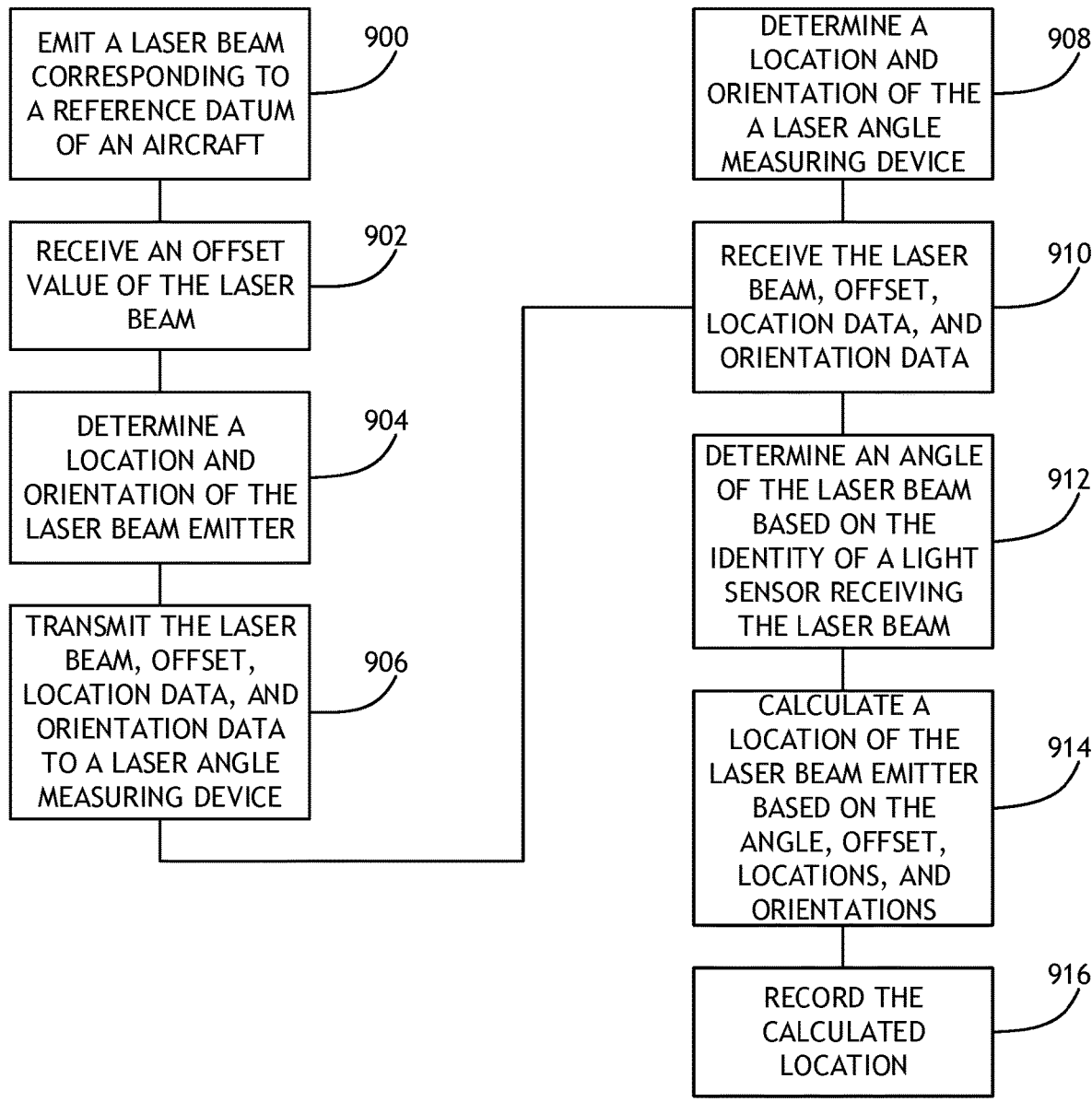
FIG. 9 Shows a flowchart of an exemplary method according to the inventive concepts disclosed herein.

Referring to FIG. 9, a flowchart of an exemplary method according to the inventive concepts disclosed herein is shown. A laser emitter emits 900 a laser beam corresponding to a reference datum of an aircraft such as the location of an antenna used in navigation. Where necessary, the laser emitter may receive 902 an offset value corresponding to a measured distance above or below the actual reference datum. In at least one embodiment, the laser emitter also determines 904 the location and orientation of the emitter. The laser emitter than transmits the laser beam, offset value, location data, and orientation data to a laser angle measuring device. In at least one embodiment, the transmission of the offset value and location and orientation data may be through a wired or wireless data connection; in another embodiment, such data may be encoded into the laser beam itself.

A laser angle measuring device determines 908 the location and orientation of the laser angle measuring device and receives 910 a laser beam from a laser emitter. In at last one embodiment, the laser angle measuring device may also receive 910 an offset value, location data, and/or orientation data from the laser emitter. The laser angle measuring device determines 912 the entry angle of the laser beam based on the identity of a light sensor or a small number of light sensors in a plurality of light sensors on a concave surface illuminated by the laser beam. Based on the angle, and potentially an offset value, location data, and orientation data from a laser emitter, the laser angle measuring device calculates 914 a location of a datum on an aircraft and records 916 such location.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A laser angle measuring device comprising:
    a plurality of light sensors disposed on a concave surface;
    a housing defining a laser light opening configured to restrict light to the plurality of light sensors;
    at least one processor in data communication with the plurality of light sensors and a memory storing processor executable code for configuring the at least one processor to:
        determine a location of the laser angle measuring device in space;
        receive a laser beam via at least one of the plurality of light sensors;
        determine an angle of the laser beam based on an identity of the at least one light sensor and a known location of the laser light opening; and
        calculate a location of a laser beam emitter in space based on the location of the laser angle measuring device and the angle of the laser beam.

2. The laser angle measuring device of claim 1, further comprising a Global Positioning System-real-time kinematic (GPS-RTK) system configured to determine the location of the laser angle measuring device.

3. The laser angle measuring device of claim 1, further comprising at least one gravity sense potentiometer, wherein the processor executable code further configures the at least one processor to determine an orientation of the laser angle measuring device.

4. The laser angle measuring device of claim 1, wherein the plurality of light sensors comprises at least two sets of light sensors, a first set comprising light sensors having a first size and a second set comprising light sensors having a second size different from the first size, the light sensors organized into a pattern to normalize angle measurements over the entire concave surface.

5. The laser angle measuring device of claim 1, further comprising:
    a plurality of data communication elements, each corresponding to a laser beam emitter; and
    at least one status identifier associated with each data communication element,
    wherein the at least one status identifier indicates an active laser beam emitter.

6. The laser angle measuring device of claim 1, wherein the processor executable code further configures the at least one processor to:
    receive an offset value corresponding to a distance of the laser beam emitter from an actual reference datum; and
    calculate a location of the actual reference datum based on the location of the laser beam emitter and the offset value.

7. The laser angle measuring device of claim 6, wherein:
    the processor executable code further configures the at least one processor to receive orientation data corresponding to an orientation of the laser beam emitter; and
    calculating the location of the actual reference datum is further based on the orientation data.

8. A method for determining a location of a reference datum on an aircraft comprising:
    determining a location of a laser angle measuring device in space;
    receiving a laser beam via at least one of a plurality of light sensors;
    determining an angle of the laser beam based on an identity of the at least one light sensor in a matrix of light sensors disposed on a concave surface and a known location of a laser light opening; and
    calculating a location of a laser beam emitter in space based on the location of the laser angle measuring device and the angle of the laser beam, wherein the laser beam emitter corresponds to the location of the reference datum.

9. The method of claim 8, further comprising determining an orientation of the laser angle measuring device.

10. The method of claim 8, further comprising iteratively calculating a location for each laser beam emitter in a plurality of laser beam emitters, each associated with a different reference datum on the aircraft.

11. The method of claim 8, further comprising:
    receiving an offset value corresponding to a distance of the laser beam emitter from an actual reference datum; and
    calculating a location of the actual reference datum based on the location of the laser beam emitter and the offset value.

12. The method of claim 11, further comprising receiving orientation data corresponding to an orientation of the laser beam emitter, wherein calculating the location of the actual reference datum is further based on the orientation data.

13. A system comprising:
    a laser beam emitter device comprising:
        at least one laser source; and
        an attachment mechanism configured to releasably attach the laser beam emitter device to a point on an aircraft surface corresponding to a reference datum; and
    a laser angle measuring device comprising:
        a plurality of light sensors disposed on a concave surface;
        a housing defining a laser light opening configured to restrict light to the plurality of light sensors;
        at least one processor in data communication with the plurality of light sensors and a memory storing processor executable code for configuring the at least one processor to:
            determine a location of the laser angle measuring device in space;
            receive a laser beam via at least one of the plurality of light sensors;
            determine an angle of the laser beam based on an identity of the at least one light sensor and a known location of the laser light opening; and calculate a location of a laser beam emitter in space based on the location of the laser angle measuring device and the angle of the laser beam.

14. The system of claim 13, wherein the laser angle measuring device further comprising a Global Positioning System-real-time kinematic (GPS-RTK) system configured to determine the location of the laser angle measuring device.

15. The system of claim 13, wherein the laser angle measuring device further comprising at least one gravity sense potentiometer, wherein the processor executable code further configures the at least one processor to determine an orientation of the laser angle measuring device.

16. The system of claim 13, wherein the plurality of light sensors comprises at least two sets of light sensors, a first set comprising light sensors having a first size and a second set comprising light sensors having a second size different from the first size, the light sensors organized into a pattern to normalize angle measurements over the entire concave surface.

17. The system of claim 13, further comprising:
a plurality of data communication elements, each corresponding to a laser beam emitter; and
at least one status identifier associated with each data communication element,
wherein the at least one status identifier indicates an active laser beam emitter.

18. The system of claim 13, wherein:
the laser beam emitter device further comprises an input device configured to input an offset value corresponding to a distance of the laser beam emitter device from an actual reference datum; and
the processor executable code further configures the at least one processor to:
receive the offset value; and
calculate a location of the actual reference datum based on the location of the laser beam emitter device and the offset value.

19. The system of claim 18, wherein:
the laser beam emitter device further comprising at least one gravity sense potentiometer to determine an orientation of the laser beam emitter device;
the processor executable code further configures the at least one processor to receive the orientation; and
calculating the location of the actual reference datum is further based on the orientation data.

20. The system of claim 19, wherein:
the laser beam emitter device further comprises a GPS-RTK system configured to determine a location of the laser beam emitter device; and
calculating the location of the actual reference datum is further based on correlating the location of the laser beam emitter device with the location of the laser angle measuring device.

* * * * *